United States Patent Office 3,307,367
Patented Mar. 7, 1967

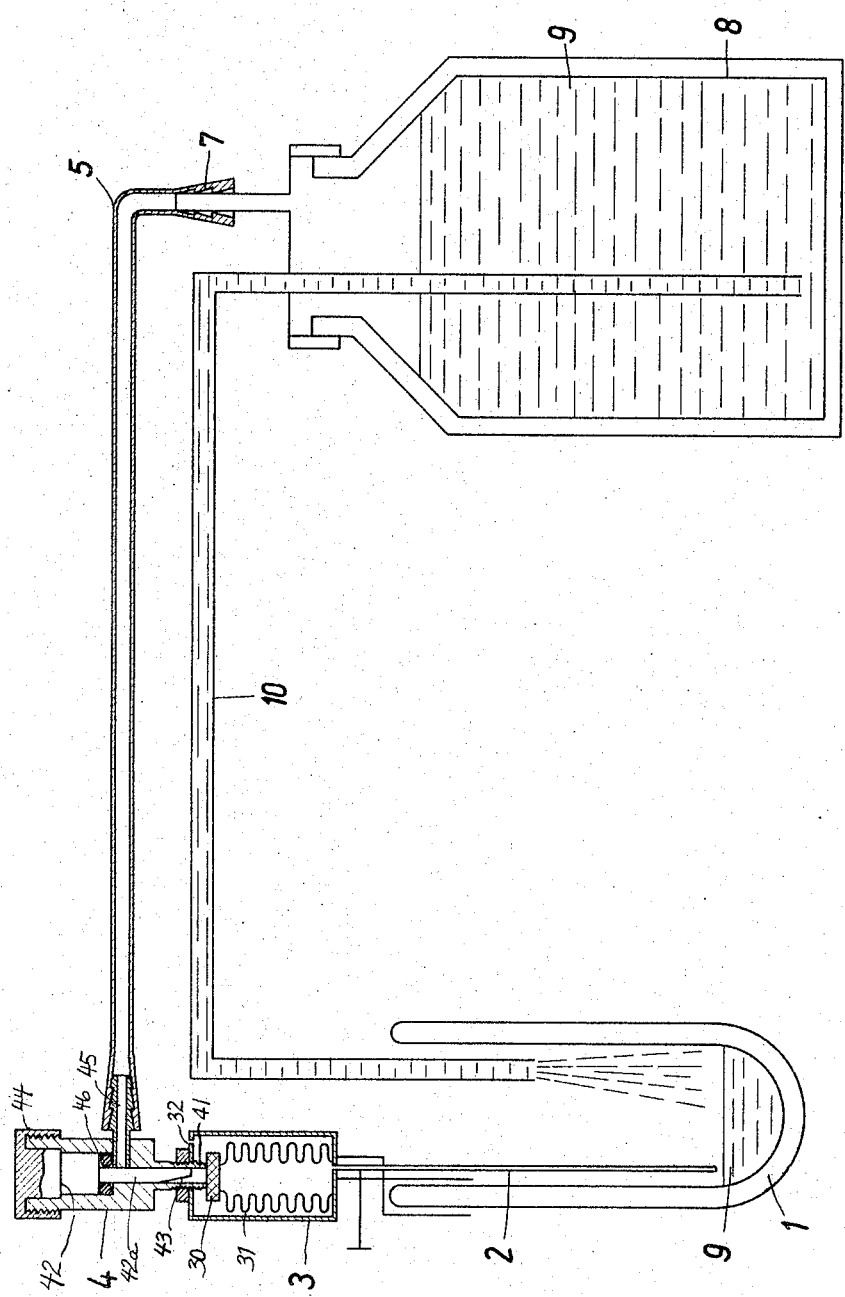

3,307,367
CONTROL DEVICE
Gustav Klipping and Hans Dietrich, Berlin-Zehlendorf, Germany, assignors to Max-Planck-Gesellschaft zur Forderung der Wissenschaften e.V., Gottingen, Germany
Filed Sept. 23, 1965, Ser. No. 489,692
Claims priority, application Germany, Oct. 28, 1964, M 62,916
6 Claims. (Cl. 62—49)

The present invention relates to a refilling system for low boiling liquids wherein the interior of the storage or supply vessel for the liquid is closed by a control valve in the exhaust gas line, the regulation of the control valve being dependent upon the level of the liquid in the working or consuming vessel, and wherein, when the gas line is blocked, the liquid is conducted from the supply vessel into the working vessel by the force of the excess pressure developed by the evaporation of the liquid.

Various systems are known for automatically refilling low boiling liquids. Due to the low boiling point of the liquid, refilling is necessary for maintaining the liquid level constant in the liquid consumption devices, for example in cooling traps. Most of the prior systems operate on the common principle that the exhaust opening of the supply vessel containing the low boiling liquid is opened or closed in dependence upon the level of the liquid in the working vessel. The liquid level may be maintained at a desired height by various known devices which operate to close the valve whereby the excess pressure developed through the evaporation of the liquid after the valve has been closed causes the liquid to be conveyed into the working vessel. This method, however, has the disadvantage that the time required for developing the necessary presusre between the closing of the control valve and the conveying of the liquid depends to a great extent upon the degree to which the supply vessel is filled. When the supply vessel is completely filled, a relatively small excess pressure is sufficient, and this rapidly develops within the relatively small volume above the liquid. In contradistinction, if the supply vessel contains only a small amount of liquid, a higher excess pressure is needed for transferring the liquid, and this higher pressure must now develop within the substantially greater volume above the liquid. Thus the time which passes before liquid conveyance commences increases substantially with decreasing level in the supply vessel. In conjunction with decreasing liquid level in the supply vessel the quantity of cold gas released upon the opening of the control valve becomes increasingly larger since a greater quantity of gas is contained within the storage vessel.

In order to accelerate the refilling process, it is possible either to conduct pressurized gas into the supply vessel upon closing of the control valve, or a heating device in the supply vessel can be operated. Both methods described before thereby provide a more complicated refilling device through the addition of a pressurized gas line or a heating circuit, which decreases the ease and safety of the operation of the refilling system. Additionally, the evaporation of liquid is substantially increased by the introduction of the pressurized gas which is at room temperature as well as by the introduction of heat into the supply vessel thereby resulting in loss of the refrigeration medium which losses are particularly noticeable in systems requiring large supply vessels or tanks. Since for economical reasons, it is desired to lower the evaporation rate in supply vessels for liquid refrigerating media by improving the heat insulation, the additional introduction of heat into the supply vessel to achieve short transfer periods appears to be contra to this desire.

It is therefore an object of this invention to provide a refilling device for low boiling liquids having almost instantaneous conveyance of the liquid from the supply vessel to the working vessel.

It is a further object of this invention to provide a refilling device for low boiling liquids wherein the need for additional gas or the application of heat is eliminated.

In accordance with the present invention, an adjustable throttle valve is connected before the control valve in the exhaust gas line. The throttle valve may be of the fine metering type wherein a finely adjustable valve element is provided for controlling the flow of the exhaust gas.

Additional objects and advantages of the present invention will become apparent upon consideration of the following description when taken in conjunction with the accompanying drawings in which the figure is a schematic view of the refilling system according to the invention.

Referring now to the drawing, there is shown in the figure a working vessel 1 having inserted therein a liquid level sensing element or level probe 2 of a control valve or regulator 3. The control valve in the illustrated embodiment is a valve of the type disclosed in my U.S. application Serial No. 103,022, filed April 14, 1961, for Control Device, now abandoned, having a valve disk 30 atop a bellows arrangement 31 filled with a condensable medium and having a vent port 32 in the valve housing. At the upper portion of the valve 3, there is provided a throttling valve 4, which may be an adjustable fine metering valve, having a lower tubular portion 41 in communicating relationship with the valve 3. Valve 4 is provided with a cylindrical valve member 42 with a rod portion 42a at its lower end. The rod portion 42a of valve member 42 has an inclined portion 43 at its lower end. At its upper end the valve member 42 is connected to an adjustable head 44, i.e., a cap member which is threaded to the valve housing. An annular gasket 46 provides gas tight sealing between the valve housing and the valve member 42, 42a. An inlet pipe 45 communicating with the interior of valve 4 is connected via an exhaust gas line 5 with an exhaust pipe 7 of the supply vessel 8 containing the low boiling liquid 9. A liquid transfer line 10 leads from the supply vessel 8 to the working vessel 1 for refilling the working vessel.

By raising or lowering the adjustable head 44 of valve 4 valve member 42 with inclined rod portion 42a is raised or lowered to increase or decrease the size of the gap between tube 41 and rod 42a in the region of the outlet end of tube 45 for varying the rate at which the gas entering via exhaust tube 5 and inlet tube 45 may exhaust into valve housing 3 and finally through vent port 32 when valve 3 is opened. When the rod 42a is in the position shown, the gas passage through throttle valve 4 is defined only by the annular gap inherently existing between the rod and the inner wall of tube 41, this corresponding to the minimum opening of valve 4. In order to increase the cross-sectional area of the gas passage through valve 4, the cap forming a portion of head 44 is rotated so as to raise rod 42a into a position where the inclined portion 43 is opposite the outlet end of tube 45. As rod 32a is moved upwardly, the area of the gas passage between tube 45 and throttle valve 3 is thus increased as inclined portion 43 moves upwardly past tube 45.

As in prior regulating devices, the conveyance of liquid from the supply vessel to the working vessel is accomplished by the pressure developed as a result of the evaporation or boiling off of the liquid within the supply vessel. The exhausting of the vaporized liquid, i.e., the gas, is controlled by a control valve which is opened to allow the exhausting of the gas and is closed to allow the gas to build up sufficient pressure to cause conveyance of the liquid.

With reference to the figure, the bellows type valve 3 which herein operates as the control valve is shown closed, and liquid is being conveyed from the supply vessel 8 to the working vessel 1. The bellows arrangement 31 and the probe 2 are filled with a condensable medium, e.g., a pressurized gas, which as long as its temperature is above the condensation point forces the bellows to its uppermost position, so that valve disk 30 on the bellows closes the communicating tube 41 between valves 3 and 4.

Assuming that the working vessel 1 is empty and that it is to be filled with liquid up to the desired level which is determined by the bottom of the level probe 2, the liquid in supply vessel 8, whose gas-containing space is closed by valve 3, is being evaporated whereby the pressure therein is increased until it is sufficient to force the liquid through the liquid transfer line 10 and to deposit it into the working vessel 1. At the time that the liquid in vessel 1 contacts the bottom of level probe 2, the condensable gaseous medium which is in the probe 2 and the bellows 31 condenses so as to undergo a reduction in volume and the valve 3 opens, so that the exhaust gas can vent from exhaust line 5, via inlet pipe 45 and the adjusted gap inside valve 4, into valve housing 3 and through opening 32. This venting of the exhaust gas from line 5 will continue until the liquid level in vessel 1 has dropped below probe 2, at which time the condensed medium inside the probe 2 evaporates and valve 3 closes again. The amount of gas exhausting per unit time while valve 3 is opened can be varied by adjusting valve 4, i.e., by adjusting the area of the gap between tube 41 and rod 42a by varying the height of inclined portion 43. Thus it is possible to adapt the exhaust of gas to the dimensions and filling height of the supply vessel 8 in such a way that, in each case, only a minimum decrease of pressure occurs during the opening time of control valve 3. That means that within supply vessel 8 a pressure is maintained which is closed to the pressure required for liquid transfer. Therefore, when the liquid level in the working container 1 drops below the level of the probe 2 and valve 3 closes, transfer of liquid through line 10 again occurs almost immediately since there has at all times been a pressure within exhaust gas line 5 and vessel 8 above liquid 9 which has been about or only slightly less than that which is required for liquid transfer and thus only a slight additional pressure developed by further evaporation of the liquid within the supply vessel is necessary to cause transfer of the liquid. Therefore, the waiting period for pressure build-up before liquid transfer starts is minimal.

Thus, the refilling device of the present invention provides a valve wherein the cross section of the exhaust opening can be adjusted with the aid of the throttle element to control the flow of the exhaust gas when the refilling process is interrupted by the opening of the control valve, thereby decreasing the pressure in the supply vessel slowly and consequently only to a minor degree. Accordingly, the excess pressure which is required, builds up within a short time after the control valve has been closed and provides almost instantaneous conveyance of the liquid to the working vessel. Moreover, the time elapsing between the closing of the control valve and the commencing of the conductance of the liquid becomes almost independent of the degree to which the supply vessel is filled. In addition, only minimal losses in refrigeration medium occur, because the release of the cold exhaust gas is controlled, and the evaporation rate of the liquid is not increased by an additional supply of heat. The head of the valve may be adjusted to vary the positions of the throttle element and therefore the flow-through cross section of the exhaust opening is adjustable and may be varied to adapt the pressure drop to the ambient conditions of different supply vessels. That is, the same refilling device may be employed, with economical operation, in connection with supply vessels of any desired dimensions due to the adjustability of the throttle valve.

The features of this invention are particularly suitable for use with separating baffles in vacuum systems. Baffles customarily used in the vacuum art have the objective of maintaining the container with the refrigeration medium as small as possible in order to decrease the flow resistance of the baffle to a minimal value. However, the baffle is only capable of functioning in connection with a sufficiently rapidly responding refill device which is independent of the level of the liquid in the supply vessel. Therefore, the present invention provides a rapidly responding refill system which may be used with vacuum systems and especially continuous operating systems for which correspondingly large containers for the refrigeration medium are required.

It will be understood that the above description of the present invention is susceptible to various modifications, changes and adaptations, and the same are intended to be comprehended within the meaning and range of equivalents of the appended claims.

What is claimed is:

1. In a refilling system for low boiling liquids wherein the interior of a supply vessel supplying the liquid is closed by a control valve in an exhaust gas line, the regulation of the control valve being dependent upon the level of the liquid in a working vessel, the blocking of the gas line by the closing of the control valve causing an excess pressure to build up through the evaporation of the liquid within the supply vessel, whereby the excess pressure causes the liquid to be conducted into the working vessel, the improvement comprising: a finely adjustable throttle means connected in front of the control valve for controlling the rate of pressure change in the supply vessel when the control valve is open.

2. The improvement as defined in claim 1 wherein said adjustable throttle means is an adjustable fine metering valve, for controlling the flow of gas through the exhaust gas line.

3. A refilling system for low boiling liquids comprising, in combination:
   a supply vessel for low boiling liquids;
   a working vessel for low boiling liquids;
   an exhaust gas line for conveying gas from said supply vessel;
   control valve means connected to said exhaust gas line, said control valve means being responsive to the level of the liquid in said working vessel for blocking said exhaust gas line when the liquid level is below a desired level;
   means for conveying liquid from said supply vessel to said working vessel; and
   throttle means connected between said exhaust gas line and said control valve for controlling the flow of gas from said supply vessel.

4. A refilling system as defined in claim 3 wherein said throttling means comprises an adjustable fine metering valve.

5. A refilling system for low boiling liquids, comprising, in combination:
   a supply vessel for low boiling liquids;
   a working vessel for low boiling liquids;
   means for conveying liquid from said supply vessel to said working vessel;
   an exhaust gas line for conveying out of said supply vessel, gas which boils off from a low boiling liquid in said supply vessel;
   control valve means inserted in said exhaust gas line and responsive to the level of the liquid in said working vessel for blocking said exhaust gas line when the liquid level is below a desired level and thus allowing gas pressure to build up in said exhaust gas line and said supply vessel for forcing liquid from said supply vessel through said conveying means and into said working vessel and for opening the exhaust gas line when the liquid level is above a desired level; and throttle means connected between said exhaust gas line and said control valve for permitting flow of the gas through said exhaust line only to a predetermined extent so that said throttle means, when exhaust gas boils off from the liquid in said supply vessel, maintains a minimum pressure within said exhaust gas line and said supply vessel.

6. A refilling system as defined in claim 5, wherein said throttle means includes adjustable means for varying the amount of gas which is permitted to flow through said exhaust line.

References Cited by the Examiner

UNITED STATES PATENTS

| | | | |
|---|---|---|---|
| 2,502,525 | 4/1950 | Krugler | 62—50 X |
| 2,619,107 | 11/1952 | Graham | 62—49 |
| 2,956,413 | 10/1960 | Jensen et al. | 62—51 |
| 3,049,887 | 8/1962 | Sharp et al. | 62—49 X |

FOREIGN PATENTS 1,211,560  10/1959  France.

LLOYD L. KING, *Primary Examiner.*